United States Patent
Douglas et al.

(10) Patent No.: US 7,600,055 B2
(45) Date of Patent: Oct. 6, 2009

(54) APPARATUS, SYSTEM, AND METHOD FOR FIRMWARE UPDATE OF REDUNDANT CONTROLLERS

(75) Inventors: Darren C. Douglas, Tucson, AZ (US); Jason J. Graves, Tucson, AZ (US); Lei Liu, Tucson, AZ (US); Keith D. Richeson, Cary, NC (US); Yoshihiko Terashita, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 11/324,436

(22) Filed: Jan. 3, 2006

(65) Prior Publication Data

US 2007/0174601 A1 Jul. 26, 2007

(51) Int. Cl.
*G06F 3/00* (2006.01)
*G06F 11/00* (2006.01)

(52) U.S. Cl. .............. 710/19; 710/8; 710/17; 710/18; 714/2; 714/6; 714/13

(58) Field of Classification Search ............ None
See application file for complete search history.

(56) References Cited

U.S. PATENT DOCUMENTS

| | | | |
|---|---|---|---|
| 6,247,168 B1 | 6/2001 | Green | 717/1 |
| 6,473,899 B1 | 10/2002 | Nelson et al. | 717/173 |
| 6,675,258 B1 * | 1/2004 | Bramhall et al. | 711/114 |
| 2001/0000355 A1 | 4/2001 | Santos et al. | 702/58 |
| 2004/0015952 A1 | 1/2004 | Lajoie et al. | 717/171 |
| 2004/0030877 A1 | 2/2004 | Frid | 713/1 |
| 2005/0120343 A1 | 6/2005 | Tai et al. | 717/173 |
| 2005/0160257 A1 * | 7/2005 | Kruger et al. | 713/2 |

* cited by examiner

*Primary Examiner*—Eron J Sorrell
*Assistant Examiner*—Dean Phan
(74) *Attorney, Agent, or Firm*—Kunzler & McKenzie

(57) ABSTRACT

An apparatus, system, and method are disclosed for updating firmware to a plurality of memory devices residing on disparate controllers wherein each controller includes an identical communication path address. A management module writes a firmware image to a memory device residing on a primary controller. The primary controller, in turn, copies the firmware image to another memory device residing on a secondary controller. In this manner, the apparatus, system, and method may update firmware on a plurality of memory devices. Because the primary controller is tasked with updating the secondary controller, the management module is only aware that the firmware of the primary controller has been updated. In this manner, updating of the firmware on the secondary controller is transparent to the management module.

12 Claims, 4 Drawing Sheets

US 7,600,055 B2

APPARATUS, SYSTEM, AND METHOD FOR FIRMWARE UPDATE OF REDUNDANT CONTROLLERS

BACKGROUND OF THE INVENTION

1. Field of the Invention

This invention relates to distributed processing systems and more particularly relates to a system and method for updating firmware in redundant embedded controllers.

2. Description of the Related Art

Data processing systems often utilize distributed processors to perform a variety of operational, management, and control functions. For example, a server class data processing system may include a main server processor and one or more embedded controllers. While the main server processor communicates with and directs the activities of the embedded controllers, the embedded controllers, in turn, communicate with and direct the operation of other subordinate devices such as memory storage devices and the like.

In one such data processing system 10, as illustrated by the block diagram of FIG. 1, a main service processor 12 communicates with a primary embedded controller 14 through the primary embedded controller's input/output interface 15a via a shared communication path 16. In this example, the shared communication path 16 is a common RS 485 bus, but may include any data communication channel known in the art. The main service processor 12 manages the primary embedded controller 14 including configuring the primary embedded controller 14, monitoring the status of the primary embedded controller 14, and updating the primary embedded controller's firmware 18a, as needed, which resides in a memory device 20a. The memory device 20a may include a static random access memory device, a flash memory device, a dynamic memory device, or other similar data storage device. The firmware 18a may include an operating system 22a that includes instruction code that is executed by the processor 24a to manage subordinate devices 26 such as data storage devices and the like.

In order to provide redundancy, a secondary embedded controller 28 communicates with the main service processor 12 through the secondary embedded controller's input/output interface 15b over the shared communication path 16. The secondary embedded controller 28 communicates with the main service processor 12 and manages the subordinate devices 26 in the event that the primary embedded controller 14 fails or becomes unavailable. In this exemplary data processing system 10, either the primary embedded controller 14 or the secondary embedded controller 28 may be active ("the active embedded controller") at any given moment, but not both. Whichever embedded controller is not currently active assumes a standby status ("the standby controller").

The primary embedded controller 14 and the secondary embedded controller 28 may communicate with each other over an inter-controller communication path 30. This communication may include the exchange of data and other information. Additionally, each embedded controller may utilize the inter-controller communication path 30 to query the active/standby status of the other embedded controller. While this example illustrates a primary embedded controller 14 and a secondary embedded controller 28, any number of embedded controllers may be attached to the same inter-controller communication path 30.

In this exemplary system, the primary embedded controller 14 assumes a default active status and the secondary embedded controller 28 assumes a default standby status. Should the primary embedded controller 14 fail or become inactive, the secondary embedded controller 28 detects this change of status via the inter-controller communication path 30 and assumes an active role in the management of the subordinate devices 26 and communications with the main service processor. When the primary embedded controller 14 becomes available again, the primary embedded controller 14 notifies the secondary embedded controller 28 via the inter-controller communication path 30 and reasserts control over the subordinate devices and communications with the main service processor 12.

The main service processor 12 communicates with the primary embedded controller 14 by transmitting messages including the primary embedded controller's address. In order to provide true redundancy, the secondary embedded controller 28 includes an address identical to that of the primary embedded controller 14. The input/output interface of the standby embedded controller is deactivated so as to prevent communication with the main service processor 12. In this manner, whichever embedded controller is currently in standby mode is transparent to the main service processor 12.

As indicated above, the main service processor 12 is tasked with updating an active embedded controller's firmware. Some embedded controllers utilize a tertiary memory device 32, such as an electrically-erasable programmable read-only memory ("EEPROM") to hold an image 34 of a firmware update. Absent such a tertiary memory device 32, updating an active embedded controller becomes problematic. Because the operating system 22a,22b is a component of the firmware 18a,18b and includes instructions that are executed by the processor 24a,24b, the operation of the embedded controller must be suspended while its firmware is updated. As such, an embedded controller experiencing a firmware update may enter standby mode, allowing its redundant embedded controller to assume management of the subordinate devices 26. However, because the main service processor initiates the firmware update, the redundant embedded controller may not communicate with the main service processor 12 during this process.

In order for the standby embedded controller to function identically to the active embedded controller, the standby embedded controller's firmware must also be updated. However, because the standby embedded controller is transparent to the main service processor 12, there is a need to transparently download firmware to both embedded controllers 14, 28.

Traditional approaches to updating firmware on multiple embedded controllers are generally not transparent to the main service processor. For example, U.S. Pat. No. 6,247,168 describes a programmable tool utilized to program multiple computing devices. However, the programmable tool is aware of each computing device to be programmed and, therefore, programming of a redundant device would not be transparent to the programmable tool.

Another design consideration of current data processing systems is the number of memory storage devices required to update an embedded controller's firmware. For example, U.S. Publication 2004/0030877 describes copying an operating system to a computing device's BIOS. The operating system is then copied from the BIOS to the computing device's firmware. However, this approach requires an additional memory storage device, the computing device's BIOS, to facilitate updating the computing device's firmware.

From the foregoing discussion, it should be apparent that a need exists for an apparatus, system, and method for updating firmware on an embedded controller and a redundant embedded controller wherein updating of the firmware of the redundant embedded controller is transparent to the main service processor. Beneficially, such an apparatus, system, and method would perform this task without the need for a separate memory device to hold an update while it is being loaded into an embedded controller's firmware.

SUMMARY OF THE INVENTION

The present invention has been developed in response to the present state of the art, and in particular, in response to the problems and needs in the art that have not yet been fully solved by currently available data processing systems. Accordingly, the present invention has been developed to provide an apparatus, system, and method for updating firmware on redundant embedded controllers that overcome many or all of the above-discussed shortcomings in the art.

The apparatus to update firmware on redundant controllers is provided with a plurality of modules configured to functionally execute the necessary steps of writing a firmware update to a memory device residing on a primary controller and copying the firmware update to another memory device residing on a secondary controller, wherein the primary and secondary controllers are redundant to each other. These modules in the described embodiments include a management module and an update module.

The apparatus, in one embodiment, is configured to detect a firmware image written by a management module to a first memory device of the primary controller and to write a copy of the firmware image to a second memory device of the secondary controller in a manner that is transparent to a management module.

The apparatus is further configured, in one embodiment, to copy firmware from the primary controller to the secondary controller without utilizing a tertiary memory device for storing the copy of the firmware image prior to writing the copy of the firmware image to the second memory device of the secondary controller.

A system of the present invention is also presented to update firmware on multiple redundant controllers. The system may be embodied as a data processing system. In particular, the system, in one embodiment, includes a management module including a service processor, a primary controller including a first memory device and having a first communication path address, a secondary controller including a second memory device and having a second communication path address identical to the first communication path address, and a shared communication path for connecting the management module to the primary controller and to the secondary controller, wherein the management module is adapted to write a firmware image to the first memory device and the primary controller is adapted to write a copy of the firmware image to the second memory device in a manner that is transparent to the management module.

The system may further include a primary controller further adapted to write the copy of the firmware image to the second memory device without utilizing a tertiary memory device to store the firmware image.

A method of the present invention is also presented for updating firmware on multiple redundant controllers. The method in the disclosed embodiments substantially includes the steps necessary to carry out the functions presented above with respect to the operation of the described apparatus and system. In one embodiment, the method includes writing a firmware image from a management module to a first memory device of the primary controller; and copying the firmware image to a second memory device of the secondary controller in a manner that is transparent to a management module. The method also may include placing the primary controller in standby mode prior to writing the firmware image to the first memory device of the primary controller.

In a further embodiment, the method includes placing the secondary controller in suspend mode prior to copying the firmware image to the second memory device of the secondary controller.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
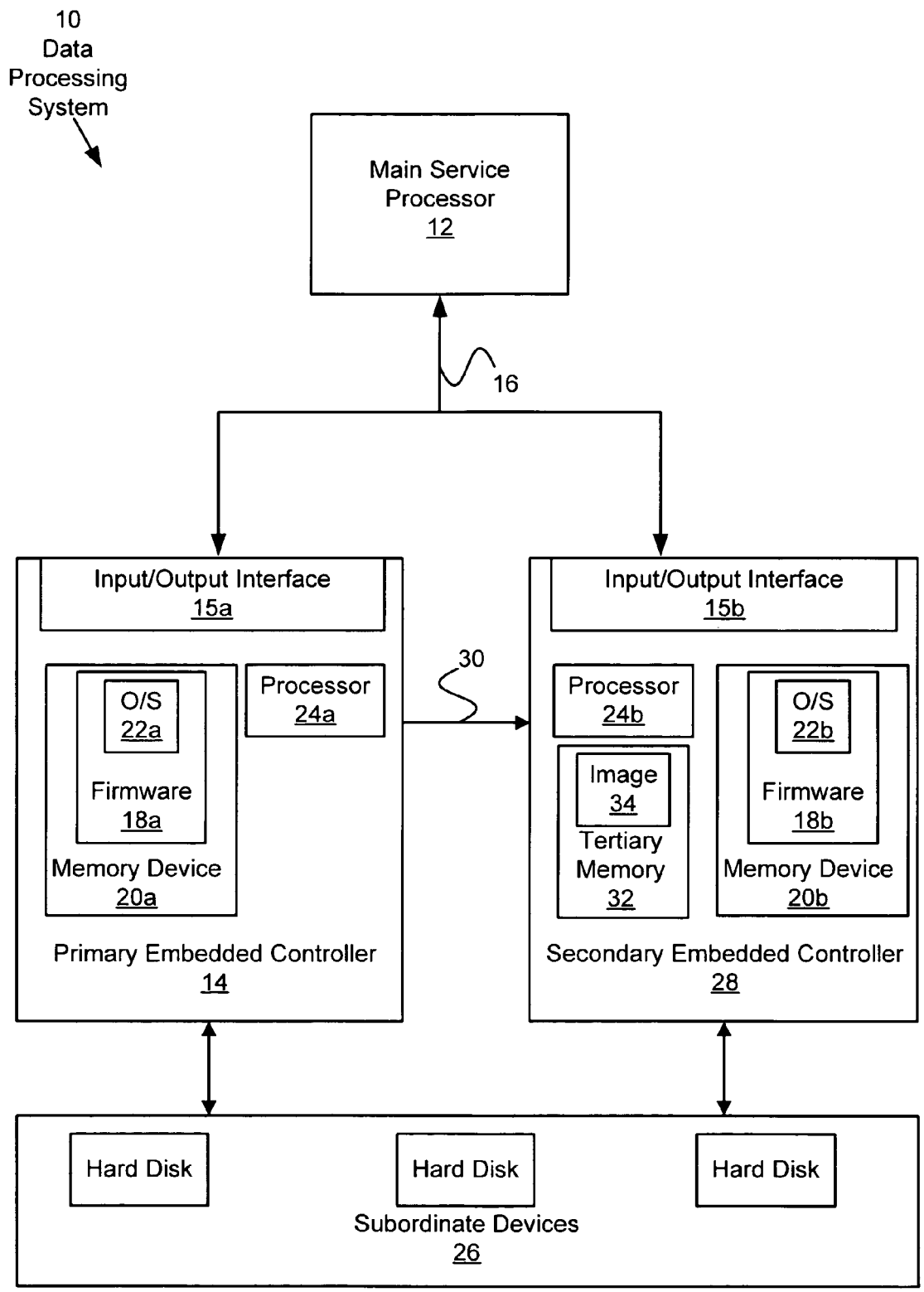
FIG. 1 is a schematic block diagram illustrating a data processing system in accordance with the current state of the art.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The invention disclosed herein may be implemented as a method, apparatus, or signal bearing medium using standard programming or engineering techniques to produce software, firmware, hardware, or any combination therefore. A signal bearing medium may take any form capable of generating a signal, causing a signal to be generated, or causing execution of a program of machine-readable instructions on a digital processing apparatus. A signal bearing medium may be embodied by a transmission line, a compact disk, a digital-video disk, a magnetic tape, a Bernoulli drive, a magnetic disk, a punch card, a flash memory, an integrated circuit, an optical storage device, a floppy disks, an electrically-erasable programmable read-only memory ("EEPROM"), a volatile memory device, a non-volatile memory device, a field programmable gate array ("FPGA"), an application-specific integrated circuit ("ASIC"), a complex programmable logic device ("CPLD"), a programmable logic array ("PLA"), a microprocessor ("uP"), a programmable logic device ("PLD"), or other digital processing device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 2:
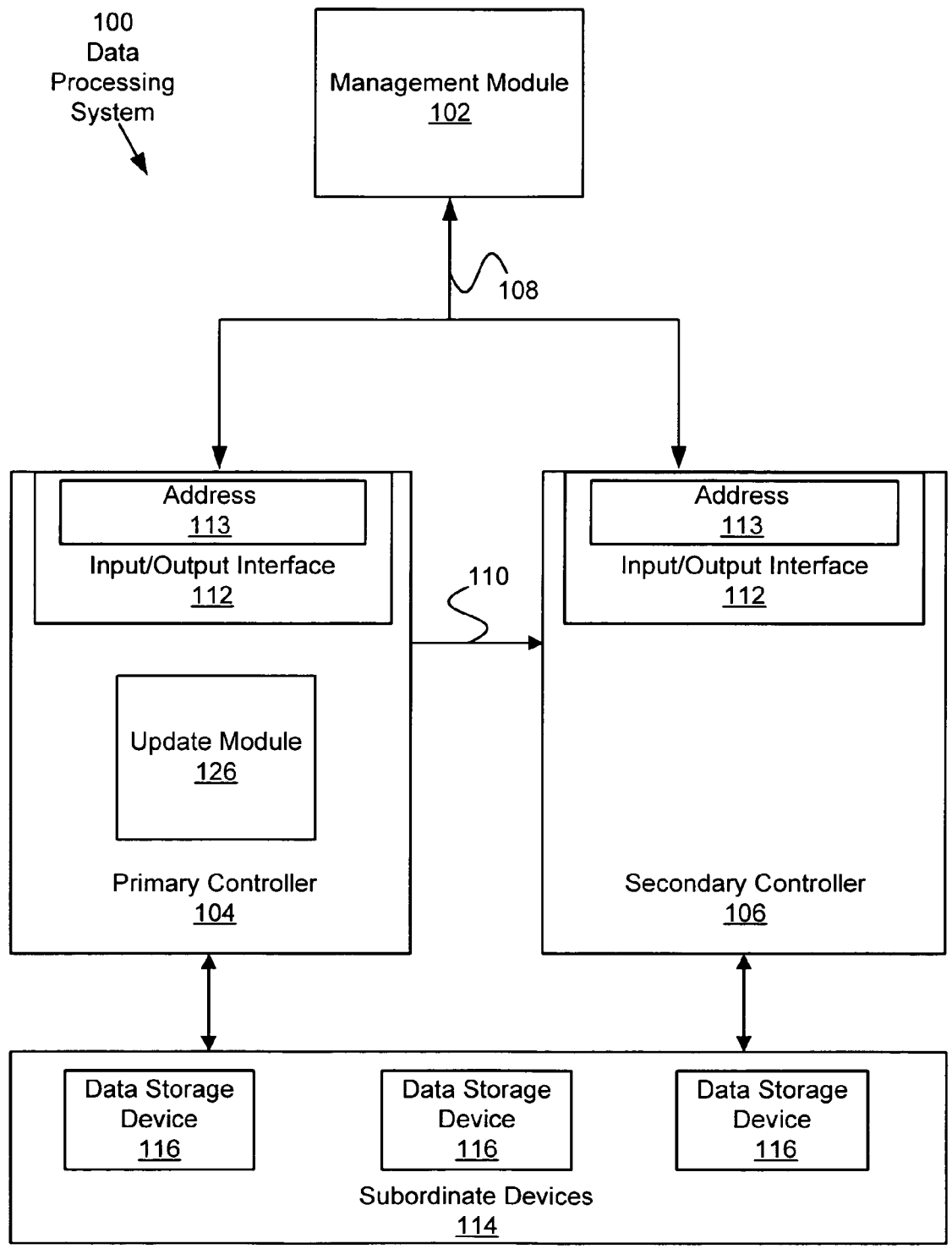
FIG. 2 is a schematic block diagram illustrating one embodiment of a data processing system in accordance with the invention.

FIG. 2 depicts a schematic block diagram of a data processing system 100, according to the invention, including a management module 102 in communication with a primary controller 104 and a secondary controller 106 via a shared communication path 108. In this embodiment of the invention, the shared communication path 108 includes a RS 485 bus. However, the invention is not limited to the use of an RS 485 bus and may include any communication path including a local-area network ("LAN"), a wide-area network ("WAN"), a wireless network, a fiber-channel network, a switched network, a PCI bus, or the like. The primary controller 104 and the secondary controller communicate with each other over an inter-controller communication path 110.

This exemplary embodiment of the invention illustrates that the primary controller 104 is responsible for directing the activity of subordinate devices 114 including data storage devices 116 which may include hard disks drives, tape cartridges, and the like. Should the primary controller 104 fail or become unavailable, its role may be assumed by the secondary controller 106.

The management module 102 may include a digital data processing device such as a service processor that may, in turn, include a field programmable gate array ("FPGA"), an application-specific integrated circuit ("ASIC"), a complex programmable logic device ("CPLD"), a programmable logic array ("PLA"), a microprocessor ("uP"), a programmable logic device ("PLD"), or other similar digital processing device. The management module 102 is tasked with configuring the primary controller 104, managing the primary controller 104, and update the primary controller's operating system.

The primary controller 104 and the secondary controller 106 may include a digital data processing device such as a field programmable gate array ("FPGA"), an application-specific integrated circuit ("ASIC"), a complex programmable logic device ("CPLD"), a programmable logic array ("PLA"), a microprocessor ("uP"), a programmable logic device ("PLD"), an embedded controller, or other similar digital processing device.

Figure 3:
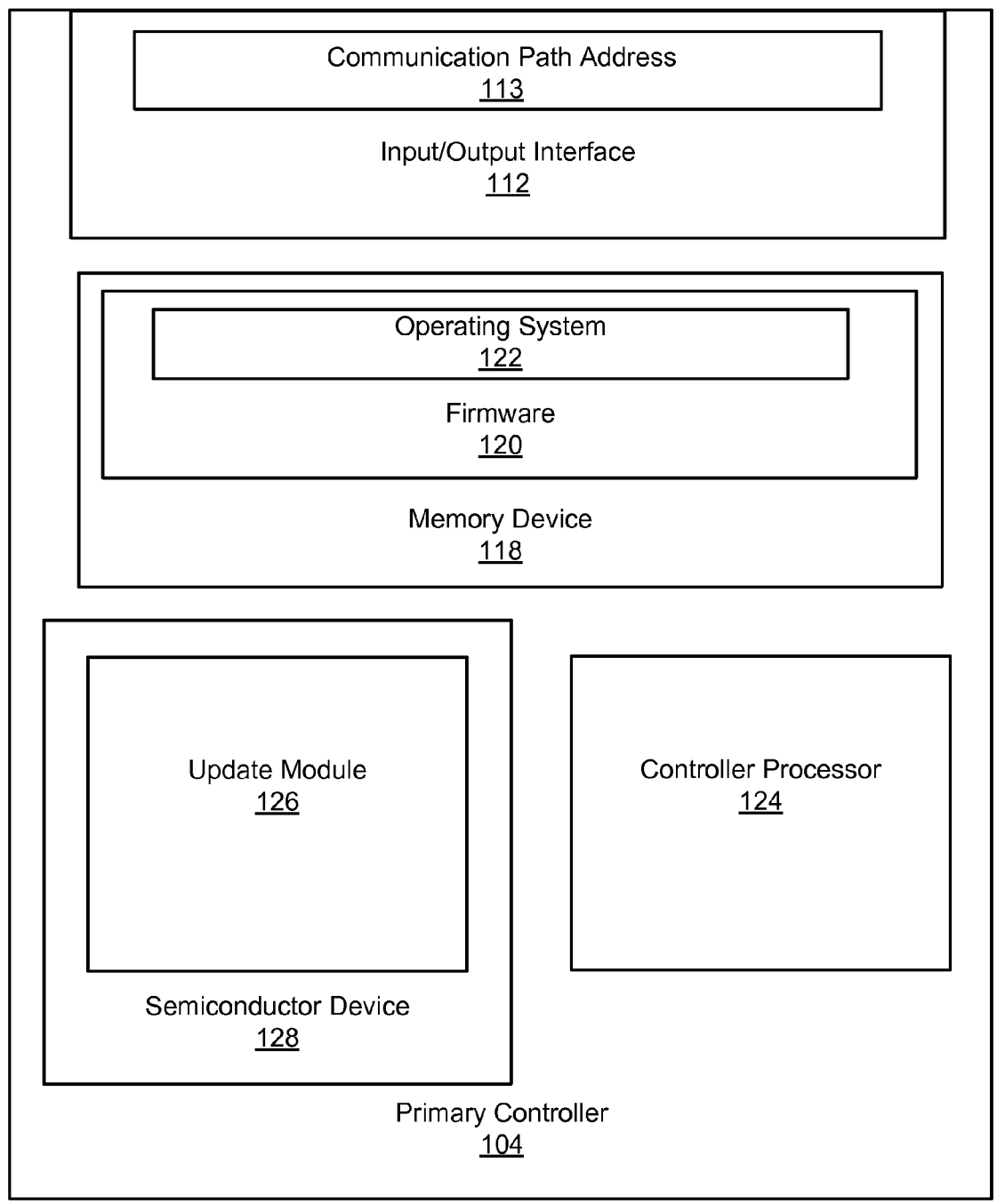
FIG. 3 is a schematic block diagram illustrating one embodiment of a controller in accordance with the invention.

FIG. 3 depicts a schematic block diagram of the primary controller 104 including an input/output interface 112 for interfacing the primary controller 104 to the shared communication path 108. The input/output interface 112 includes a communication path address 113. This address is utilized by the primary controller 104 to identify messages arriving from the management module 102. In this exemplary embodiment of the invention, the primary controller 104 is configured to be the primary device responsible for communicating with the management module 102 and managing subordinate devices 114 including data storage devices 116. While performing these functions, the primary controller 104 operates in active mode.

The schematic block diagram of FIG. 3 also illustrates the elements of the secondary controller 106, with the primary distinction between the primary controller 104 and the secondary controller 106 being the fact that the primary controller is configured to default to an active state while the secondary controller is configured to default to a standby state. Here, the secondary controller 106 is configured to be a redundant device of the primary controller 104. The communication path address 113 of the input/output interface of the secondary controller 106 is the same as that of the primary controller 104. As such, the communication path addresses 113 of the primary controller 104 and the second controller may be viewed as a common communication path address.

The secondary controller 106 operates predominantly in standby mode, indicating that it is not currently active in communications with the management module 102 nor is it currently managing the subordinate devices 114. While this embodiment of the invention is illustrated with only two controllers 104,106, any number of controllers may be in communication with the management module and each other so as to provide redundant control of the subordinate devices 114.

The secondary controller 106 includes an address on the shared communication path 108 that is identical to that of the primary controller 104. In this manner, should the primary controller 104 fail or become unavailable, the secondary controller 106 may become active, communicate with the management module 102, and manage the subordinate devices 114.

Because the primary controller 104 and the secondary controller 106 share the same address, the existence of a redundant controller is transparent to the management module 102.

To prevent the management module from simultaneously communicating with both the primary controller 104 and the secondary controller 106, the input/output interface of whichever controller is currently in standby mode is temporarily deactivated. Should a controller change its status from standby mode to active mode, its input/output interface is turned on, allowing it to communicate with the management module 102.

Each controller 104,106 includes a memory device 118 such as a flash memory device, a static random-access memory ("SRAM") device, a dynamic random-access memory ("DRAM") device, or the like containing firmware 120. This firmware 120 includes the operating system 122 for its corresponding controller 104,106 including operating instructions which are loaded onto and executed by the controller processors 124.

In this embodiment of the invention, each controller 104, 106 utilizes a boot procedure when it is either powered-on or reset. During this boot procedure, each controller 104,106 queries other controllers connected to the inter-controller communication path. If a primary controller 104 detects other active controllers, it notifies the active controller that the primary controller 104 is about to become active and that the other active controller should enter standby mode. Alternatively, upon boot, the primary controller 104 may become active and any other active controller must detect that the primary controller 104 is now active. If a secondary controller 106 detects other active controllers during its boot process, it enters standby mode. Alternatively, if no other active controller is detected, the secondary controller 106 enters active mode, communicates with the main module 102, and manages the subordinate devices 114.

The data processing system 100 includes an update module 126 (FIG. 2) tasked with managing the firmware update of the secondary controller 106. While the management module 102 is responsible for updating the firmware of the primary controller 104, the update module 126 is responsible for updating the firmware of the secondary controller 106. This is necessitated by the fact that, while the primary controller 104 is active, the secondary controller 106 is transparent to the management module 102. While the update module 126 is illustrated in this embodiment of the invention as residing within the primary controller 104, the functionality of the update module may be distributed over both the primary controller 104 and the secondary controller 106. Additionally, the update module 126 may reside as an algorithm on a semiconductor device 128.

Figure 4:
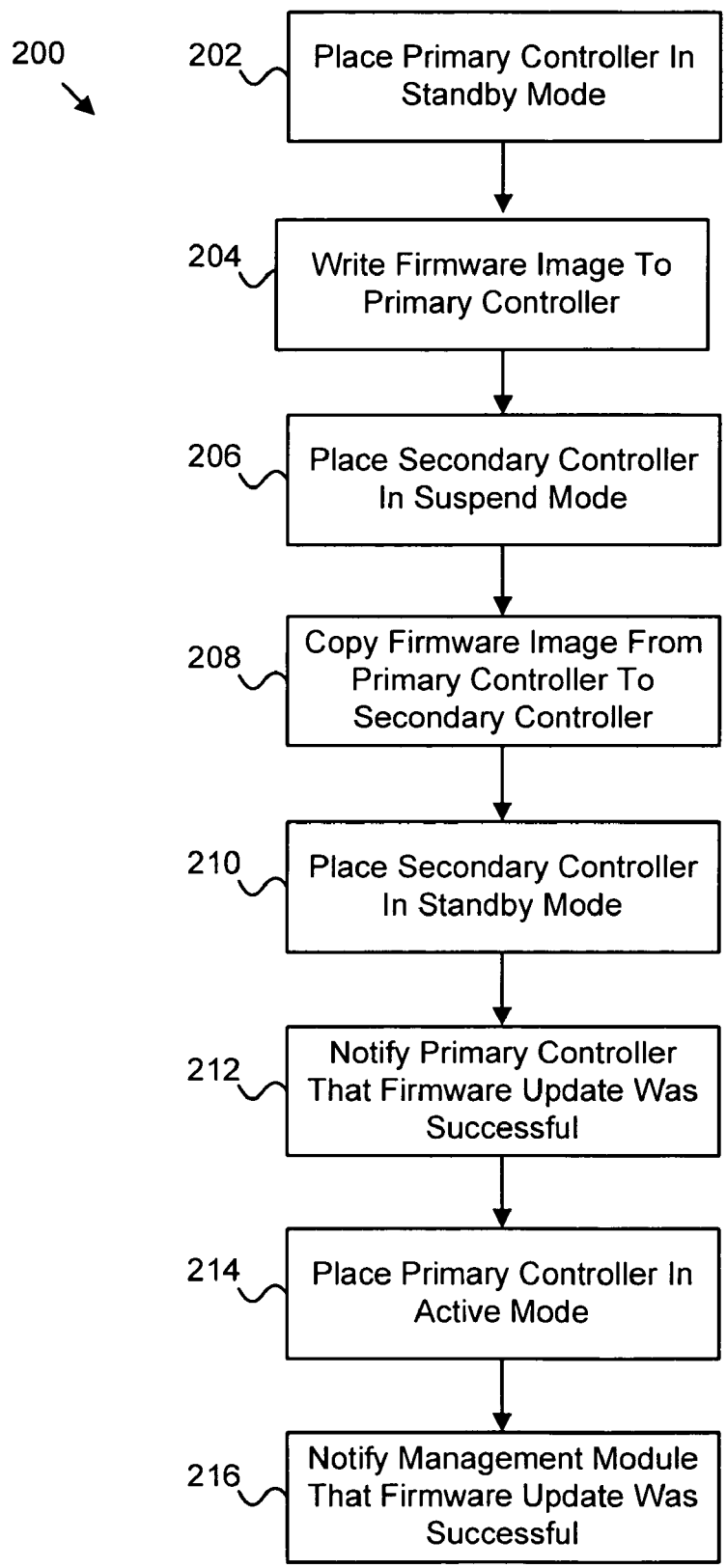
FIG. 4 is a block diagram illustrating a process for updating firmware on redundant controllers, according to one embodiment of the present invention.

The block diagram of FIG. 4 illustrates a firmware update algorithm 200. The depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The firmware update algorithm 200 begins when the management module 102 initiates a firmware update by placing 202 the primary controller 104 in standby mode. This is necessary to prevent the primary controller 104 from managing the subordinate devices 114 while the firmware 120 is updated. While the primary controller 104 is in standby mode, the secondary controller 106 temporarily becomes active so that it may manage the subordinate devices 114. However, the input/output interface 112 of the secondary controller 106 remains deactivated so as to prevent the secondary controller from communicating with the managing module 102.

Next, the management module 102 overwrites 204 the existing firmware 120 in the memory device 118 of the primary controller 104 with a new firmware image. Because the primary controller does not include a tertiary memory device for storing a firmware image before copying it to the memory device 118 of the primary controller, the new firmware image is written directly to the memory device 118.

Once the updated firmware image has been written to the primary controller, the primary controller places 206 the secondary controller in suspend mode. This prevents the secondary controller from managing the subordinate devices while its firmware is updated. The primary controller 104 then copies 208 the firmware image from the primary controller's memory device to the secondary controller 106. Because the primary controller also does not include a tertiary memory device for storing a firmware image, the copy of the firmware image is written directly to the memory device 118 of the secondary controller. It is important to note that the primary controller reads operating instructions for execution on the primary controller's controller processor 124 from the primary controller's memory device 118 while reading the firmware image 120 for transfer to the secondary controller 106 from the same memory device 118.

Once the firmware image has been copied to the memory device 118 of the secondary controller, the controller processor 124 of the secondary controller 106 reboots. During this reboot process, the secondary controller 106 queries the primary controller 104. This query notifies 212 the primary controller 104 that the firmware update of the secondary controller 106 has been successful. The primary controller 104 returns 214 to active mode and notifies 216 the management module 102 that the firmware update originated by the management module 102 has been successful.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to copy firmware, the apparatus comprising:

a primary controller having a first memory device and a first communication address on a shared communication path and managing subordinate devices;

a secondary controller having a second memory device and a secondary communication address on the shared communication path identical to the first communication address, the primary controller in communication with a management module over the shared communication path and the secondary controller disabled from communicating with the management module over the shared communication path and not activated to manage the subordinate devices;

the management module placing the primary controller in standby mode and activating the secondary controller, wherein the primary controller is in communication with the management module and does not manage the subordinate devices, the secondary controller is disabled from communicating with the management module, and the secondary controller manages the subordinate devices, the management module further writing a firmware image to the first memory device;

the primary controller placing the secondary controller in suspend mode;

an update module, after the secondary controller is in suspend mode, writing a copy of the firmware image from the first memory device to the second memory device in a manner that is transparent to the management module in response to the management module writing the firmware image to the first memory device;

the secondary controller rebooting while the primary controller is in standby mode and the secondary controller not managing the subordinate devices in response to the copy of the firmware image written to the second memory device and notifying the primary controller that the copy of the firmware image is successfully received; and the primary controller activating to manage the subordinate devices and placing the secondary controller in the standby mode in response to the notification from the secondary controller, wherein the secondary controller does not manage the subordinate devices.

2. The apparatus of claim 1, wherein said writing the copy of the firmware image from the first memory device to the second memory device is performed without utilizing a tertiary memory device for storing the copy of the firmware image prior to writing the copy of the firmware image to the second memory device of the secondary controller.

3. The apparatus of claim 2, wherein the secondary controller is redundant to the primary controller.

4. The apparatus of claim 3, the apparatus further comprising an inter-controller communication path facilitating the writing of the firmware image to the second memory device by the primary controller and wherein the shared communication path is a Peripheral Component Interconnect (PCI) bus.

5. A system to update firmware on a plurality of controllers, the system comprising:

a management module comprising a service processor;

a shared communication path for connecting the management module to a primary controller and a secondary controller;

the primary controller comprising a first memory device and having a first communication path address on the shared communication path and managing subordinate devices;

the secondary controller comprising a second memory device and having a second communication path address on the shared communication path identical to the first communication path address, the primary controller in communication with a management module over the shared communication path and the secondary controller disabled from communicating with the management module over the shared communication path and not activated to manage the subordinate devices;

the management module placing the primary controller in standby mode and activating the secondary controller, wherein the primary controller is in communication with the management module, the secondary controller is disabled from communicating with the management module, and the secondary controller manages the subordinate devices, the management module further writing a firmware image from the management module to the first memory device;

the primary controller placing the secondary controller in suspend mode;

an update module, after the secondary controller is in suspend mode, writing a copy of the firmware image to the second memory device in a manner that is transparent to the management module in response to the management module writing the firmware image to the first memory device;

the secondary controller further rebooting while the primary controller is in standby mode and the secondary controller not managing the subordinate devices in response to the copy of the firmware image written to the second memory device and notifying the primary controller that the copy of the firmware image is successfully received; and the primary controller activating to manage the subordinate devices and placing the secondary controller in the standby mode in response to the notification from the secondary controller, wherein the secondary controller does not manage the subordinate devices.

6. The system of claim 5, wherein said writing the copy of the firmware image to the second memory device is performed without utilizing a tertiary memory device to store the firmware image.

7. The system of claim 6, further comprising an inter-controller communication path facilitating the writing of the copy of the firmware image to the second memory device by the primary controller.

8. The system of claim 7, wherein the secondary controller is redundant to the primary controller and the shared communication path is a PCI bus.

9. A semiconductor device storing executable code executed by a processor to perform an operation to copy firmware from a primary controller managing subordinate devices and having a first communication address on a shared communication path to a secondary controller having a secondary communication address on the shared communication path identical to the first communication address, the primary controller in communication with a management module over the shared communication path and the secondary controller disabled from communicating with the management module over the shared communication path and not activated to manage the subordinate devices, the operation comprising:

placing the primary controller in standby mode wherein the primary controller is in communication with the management module and does not manage the subordinate devices;

activating the secondary controller, wherein the secondary controller is disabled from communicating with the management module, and the secondary controller manages the subordinate devices;

writing a firmware image from a management module to a first memory device of the primary controller;

placing the secondary controller in suspend mode by the primary controller;

copying, after the secondary controller is in suspend mode, the firmware image from the first memory device to a second memory device of the secondary controller in a manner that is transparent to the management module in response to the management module writing the firmware image to the first memory device;

rebooting the secondary controller while the primary controller is in standby mode and the secondary controller not managing the subordinate devices in response to the copy of the firmware image written to the second memory device;

notifying the primary controller that the copy of the firmware image is successfully received; and activating the primary controller to manage the subordinate devices and placing the secondary controller in the standby mode in response to the notification from the secondary controller, wherein the secondary controller does not manage the subordinate devices.

10. The semiconductor device of claim 9, wherein the secondary controller is redundant to the primary controller and the shared communication path is a PCI bus, and wherein said copying the firmware image from the first memory device to the second memory device is performed without utilizing a tertiary memory device for storing the copy of the firmware image prior to writing the copy of the firmware image to the second memory device of the secondary controller.

11. A method for copying firmware from a primary controller managing subordinate devices and having a first communication address on a shared communication path to a secondary controller having a secondary communication address on the shared communication path identical to the first communication address, the primary controller in communication with a management module over the shared communication path and the secondary controller disabled from communicating with the management module over the shared communication path and not activated to manage the subordinate devices, the method comprising:

placing the primary controller in standby mode wherein the primary controller is in communication with the management module and does not manage the subordinate devices;

activating the secondary controller, wherein the secondary controller is disabled from communicating with the management module, and the secondary controller manages the subordinate devices;

writing a firmware image from the management module to a first memory device of the primary controller;

placing the secondary controller in suspend mode by the primary controller;

copying, after the secondary controller is in suspend mode, by use of a processor, the firmware image from the first memory device to a second memory device of the secondary controller in a manner that is transparent to the management module in response to the management module writing the firmware image to the first memory device;

rebooting, by use of the processor, the secondary controller while the primary controller is in standby mode and the secondary controller not managing the subordinate devices in response to the copy of the firmware image written to the second memory device;

notifying, by use of the processor, the primary controller that the copy of the firmware image is successfully received; and activating the primary controller to manage the subordinate devices and placing the secondary controller in the standby mode in response to the notification from the secondary controller, wherein the secondary controller does not manage subordinate devices.

12. The method of claim 11, wherein the secondary controller is redundant to the primary controller and the shared communication path is a PCI bus, and said copying firmware image from the first memory device to the second memory device is performed without utilizing a tertiary memory device for storing the copy of the firmware image prior to writing the copy of the firmware image to the second memory device of the secondary controller.

* * * * *